Jan. 24, 1933. A. MEYER 1,895,003
STEAM TURBINE
Filed May 21, 1931 2 Sheets-Sheet 1

Inventor
Adolf Meyer
By Alfred H. Dyson
Attorney.

Jan. 24, 1933.  A. MEYER  1,895,003
STEAM TURBINE
Filed May 21, 1931   2 Sheets-Sheet 2
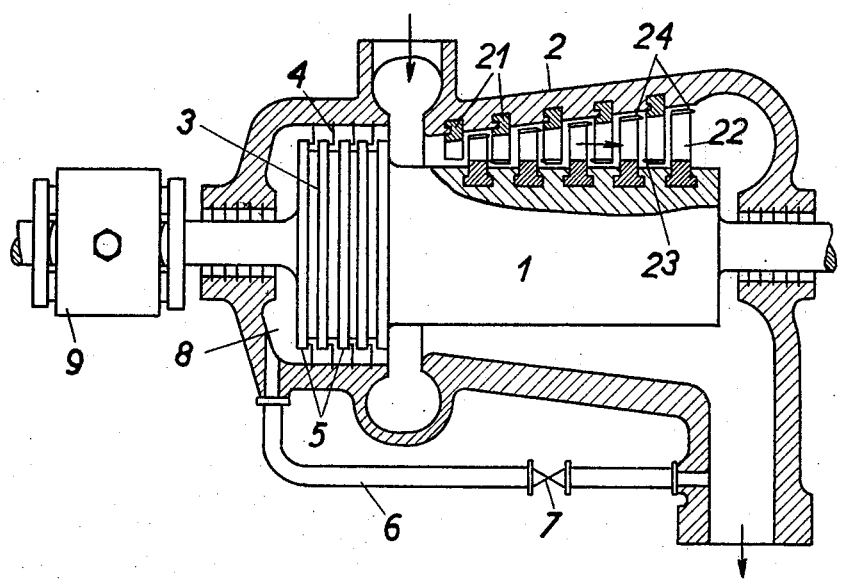
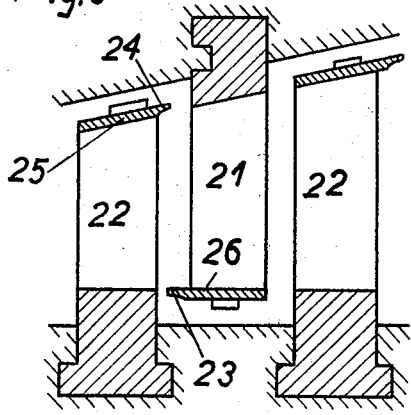 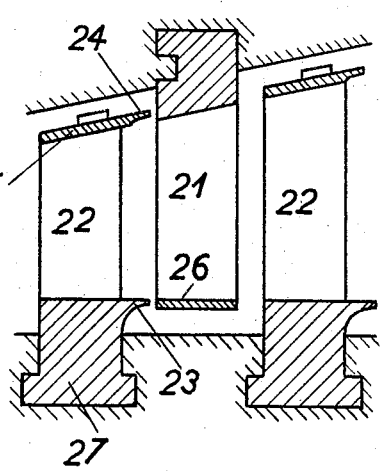
Inventor
Adolf Meyer
By Alfred N. Dyson
Attorney.

Patented Jan. 24, 1933

1,895,003

UNITED STATES PATENT OFFICE

ADOLF MEYER, OF KUSNACHT NEAR ZURICH, SWITZERLAND, ASSIGNOR TO AKTIEN-GESELLSCHAFT BROWN, BOVERI & CIE., OF BADEN, SWITZERLAND, A JOINT-STOCK COMPANY OF SWITZERLAND

STEAM TURBINE

Application filed May 21, 1931, Serial No. 538,952, and in Germany May 26, 1930.

My invention relates to improvements in steam turbines, and more particularly to the means for maintaining the clearance between the moving and stationary blades at a minimum for maximum efficiency.

Labyrinth packing strips in steam turbines are frequently constructed in the well known manner with axial projections for making the packing independent of radial expansions of the shaft due to centrifugal forces and heat. The efficiency of such a packing depends on the amount of the axial clearance between the fixed and moving parts. This clearance is determined by an axial thrust bearing which determines the axial position of the shaft with respect to the fixed part. In a steam turbine there may be great differences in temperature between the shaft and the casing under different operating conditions, and the axial clearance in the packing must be such that all differences due to the expansion are allowed for without any axial rubbing in the packings. Resulting from this axial expansion, undesirably large axial clearances occur with large machines or with high temperatures, thereby causing correspondingly greater steam losses. This applies more particularly to the dummy pistons which are provided in reaction turbines for balancing the axial thrust of the blading. It is already known that these losses can be reduced by bringing the shaft, at all temperature conditions, as close as possible to these packings by a so-called automatic pressure balance, so that the axial position of the shaft is no longer determined by the thrust bearing but from the influence of the pressures through the glands acting on the shaft or dummy piston. In this case the thrust bearing must allow for the movement determined by the dummy piston and its packing, and limit only the extreme positions of the shaft for preventing rubbing. The carrying out of this idea, however, provides considerable difficulties due to the differences in expansion between the shaft and the casing and to axial oscillations of the shaft, as will be more particularly explained below.

For the purpose of illustrating my invention, an embodiment thereof is shown in the drawings, wherein Figure 1 is an elevational view, partly in section and partly diagrammatic, of a steam turbine embodying my invention;

Fig. 5 is a view similar to Fig. 1, some of the parts being shown in greater detail;

Fig. 6 is an enlarged, fragmentary, detail view, taken from Fig. 5; and

Fig. 7 is a view similar to Fig. 6, showing a modification.

Figure 1:
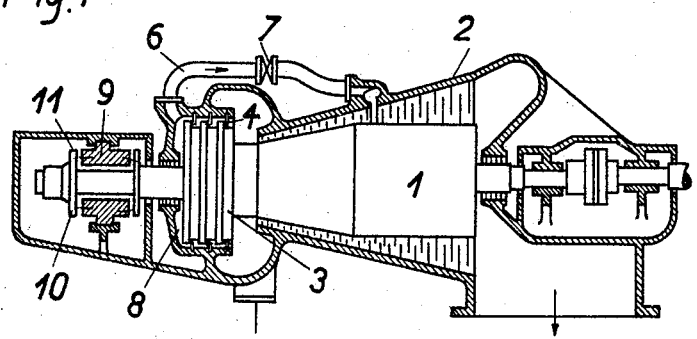
Figure 2:
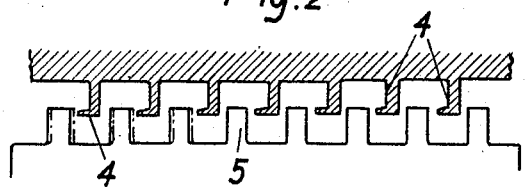
Fig. 2 is an enlarged, fragmentary view, taken from Fig. 1.

In Fig. 1 of the accompanying drawings 1 is the rotor and 2 the casing of the turbine. 3 is, for example, a dummy piston for balancing the axial thrust acting on the blading of the shaft 1, and 4 are the packings on the dummy piston, which are shown in Fig. 2 with the corresponding part of the piston to an enlarged scale. The steam flows through the sealing gaps between the packing members 4 and the collars 5 on the shaft and through the pipe 6 to a lower stage of the turbine or to the condenser. In this pipe is a regulating member 7 such as a valve or throttle-plate, which permits of a regulation of the quantity of steam flowing through. This balance operates automatically in the following manner. Should there be an unbalanced force in the direction of the flow of the steam, caused, for instance, by a change of the loading, the shaft will be displaced towards the packing strips, for example, from the position shown in full lines in Fig. 2 into that shown in dot dash lines. This causes the clearances to become smaller, the quantity of leakage steam to be reduced and the pressure in the space 8 behind the dummy piston to drop until the axial force is balanced. When there is an unbalanced force in the opposite direction, the clearances will become greater, the pressure in the space 8 will increase, as the outflow of the steam is throttled by the valve 7, and equilibrium will be reestablished. This balance of pressure can only be effective as long as there is a drop in pressure in the turbine, that is to say, when there is a certain load on the turbine. When running idle, in which case practically the whole turbine is under vacuum, the balancing forces are so small that the shaft is no longer controlled axially and may take up any position due to any influence. The thrust bearing should therefore be so adjusted that, in spite of the non-existence of the axial adjustment by the pressure forces, the collars 5 on the shaft will not come in contact with the packing members 4. In this case, as already stated, there will be considerable difficulties owing to the different heat expansions of the shaft and the casing. In the cold state the thrust bearing 9, for instance, is set in such a manner that when the collar 10 of the shaft is in contact with it, that is to say, when there is no clearance at 11 the clearance in the labyrinth packing between 5 and 4 will also be very small, but still great enough to prevent any rubbing of the packings. When in operation the shaft will become slightly longer than the cylinder. The thrust forces acting on the shaft also keep the clearance in the packing between 5 and 4 very small, for instance $\frac{1}{10}$ mm., so that the collar 10 of the thrust bearing moves to the left owing to the shaft becoming longer. There will then be clearance at 11. The machine thus runs with the thrust bearing completely unloaded. On shutting down the machine the direction-imparting thrust forces suddenly cease and the shaft can run to the right and will then grind off the packing projections until the collar 10 again bears against the thrust bearing. On re-starting the machine the next time with the ground off packing projections, the clearance between 5 and 4 is too great by the difference of the shaft expansions. This great amount of clearance results in the pressure in the space 8 being very great, and the effect of the dummy piston and consequently the balance of the machine is destroyed. The displacement of the shaft for automatically counteracting the axial thrust is not possible as the collar 10 bears against the thrust bearing and prevents any displacement of the shaft. The thrust bearing will then have to take up the full thrust to the extent that the balance is destroyed by too great a clearance in the packings. Under this great pressure the thrust bearing will be worn down and the shaft will move towards the right until the clearances in the packing are again reduced and the automatic balance is again established. The state of the machine is then the same as it was to start with, and the next time the machine is shut down a grinding off of the packings will take place again, and on starting up the next time the thrust bearing will be worn off again, and so on.

A further difficulty occurs in service if the shaft is not held by the thrust bearing as required, and begins to oscillate axially, causing heavy axial kicks, in which case there exists the danger of the packings rubbing. These oscillations are due to the fact that on the shaft becoming displaced, for instance, to the left, there will not immediately be a counter pressure in the space 8, as this space must first be filled. In the meantime the shaft obtains a certain axial velocity, and owing to its momentum will move further than corresponds to the state of equilibrium. The shaft will thereupon be repulsed, and will travel in the other direction beyond the position of equilibrium, as the space 8 cannot empty sufficiently rapidly.

The two difficulties referred to above are overcome according to the present invention by the shaft being pushed away from the packings by external forces, for instance by means of springs, weights or oil-pressure pistons, in order to prevent rubbing, as soon as the steam pressures acting on the shaft have dropped, when the turbine is under a small load, below an amount at which the shaft would no longer be held axially in a definite position.

Figure 3:
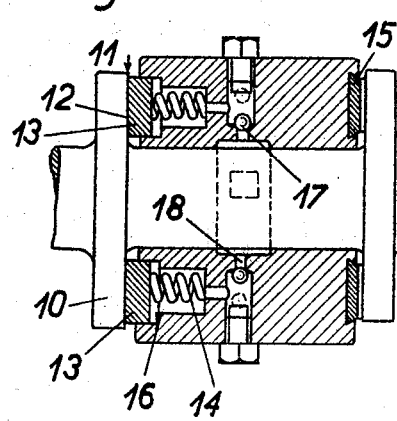
Fig. 3 is an enlarged, sectional view of one of the parts in Fig. 1.

For example, rubbing of the packings, due to the absence of thrust forces caused by the expansion of the shaft, is prevented through the undivided or divided bearing surface 12 of the thrust bearing 9, not being solid as is the case in Fig. 1, but axially displaceable, as shown in Fig. 3. The supporting members 13, which in this case form the bearing surface and are referred to hereinafter also as the butting members, are supported by strong springs 14, which in the example shown force the shaft towards the left, that is to say, away from the packing strips, as soon as the load becomes small, and the thrusts acting on the dummy piston 3 have become insufficient. In this way the machine will start up even with a considerable amount of clearance between the collars 5 and the packing strips 4. Only at a certain minimum load, when the automatic balance piston forces the shaft to the right, will the springs 14 be compressed, until the clearances between 5 and 4 are correct. On the other side of the thrust bearing is a supporting ring 15, consisting of one or of several parts, which prevents the shaft moving too far to the left. It is positioned so far to the right that even with the greatest expansion of the shaft it can still ease off from its bearing surface and render an automatic balance possible.

When shutting down the machine, as soon as the pressures in the turbine become so small that the thrust is removed and the shaft takes up any position so that the packings between 5 and 4 could grind, the shaft is then displaced away from the packings by an external force provided by the springs 14. This movement, exerted by means of the springs, takes place in the opposite direction to the displacement caused by the cooling. This increase of the clearance by an external force has nothing to do with an increasing of the clearance by cooling and contraction of the shaft within a gland.

Figure 4:
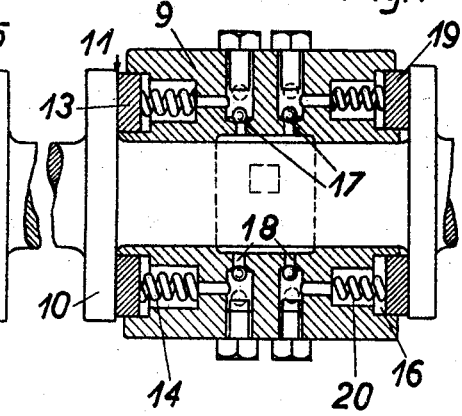
Fig. 4 is a view similar to Fig. 3, showing a modification.

Axial oscillations of the shaft are prevented by the movements of the shaft being damped, for instance, by an oil damping device. In Fig. 3 the butting members 13, by way of example, are constructed in the form of a damping device such that when these members move in the axial direction they displace oil from the space 16. For improving the damping effect, one or more non-return valves 17 are provided, through which oil can flow in from the space 18, when the bearing surface 12 moves to the left. During the return motion of these butting members 13 the valves 17 close, so that the full damping force acts on the butting members. For increasing the damping action a movable butting member 19 in one or more parts may be provided on the other side of the bearing, as shown in Fig. 4, in place of the fixed supporting member 15, the movements of which member 19 are also damped in an oil space 18. This second butting member is kept pressed, for instance, by springs 20 against the shaft collar. Its movement to the left must be limited in such a manner that the shaft never moves too far to the left. It is obvious that the springs 14 under the butting members 13 must be considerably stronger than the springs 20 under the butting member 19, in order that the shaft will be pushed away, in any case, with sufficient force from the packing members 4 when the steam pressures in the turbine are absent.

All the butting members, or some of them, could be constructed in the manner of segmental thrust bearings.

It is known that in the same way that clearances in the labyrinth packings cause losses, so also, clearances between the fixed and moving blades give rise to energy losses. Endeavours are made in many ways to reduce these losses to a minimum. For example, the clearances are reduced by axial projections. The effect of these measures depends on the smallness to which the clearances can be adjusted having consideration for the reliability of the machine in service. With the usual construction in which the axial position of the shaft is fixed by a thrust bearing, the clearance must be made comparatively large in consideration of the various expansions of the cylinder and shaft due to heat.

It has already been suggested to displace the thrust bearing after setting to work, in order to make the clearance smaller. This, however, introduces an undesirable complication in the running of the machine.

A considerable improvement can be experienced by the utilization of a similar construction to that specified in this invention. With the automatic balancing of the shaft thrust the shaft is not held in a definite position by the thrust bearing, but by means of the automatic adjustment of the clearance in the labyrinth packings of the dummy piston. If the axial projections on the blades are so arranged that a displacement of the shaft reduces the clearance in the labyrinth packings of the dummy piston, and at the same time also reduces the clearance in the blading so that in service when a small blading clearance occurs one also attains automatically a small clearance in the dummy piston packings, while at starting the required large clearance exists.

In the foregoing, devices are described whereby with increasing steam pressure after the valve, for instance, with increasing loading, the displacement of the shaft is such that the clearance in the dummy piston packings becomes smaller. In the following descriptive arrangement not only the clearance in the dummy piston packings is reduced with increasing steam pressures, but also the blading clearances become smaller, and thereby the reliability in service is further increased.

This further elaboration of the invention can be realized in many ways.

Fig. 5 indicates a possible construction, wherein 1 is again the shaft, 2 the casing of the turbine, 3 is the dummy piston, 4 are the fixed packing strips that seal axially against the rotating collars 5 of the dummy piston, 21 are the guide blades, 22 the moving blades, and 23 and 24 are the axial sealing projections of the blading. 6 is the pipe which carries away the leakage steam from chamber 8 behind the dummy piston direct into the condenser. 7 is a valve or throttle-plate to regulate the pressure in chamber 8. 9 is a thrust bearing constructed according to the illustrations given in Fig. 3 or Fig. 4.

It is clear that a displacement of the shaft in the direction of the steam flow reduces the clearance in the blading as well as in the packings of the dummy piston, and such a displacement causes a drop in pressure in the chamber 8, and the effect is that the shaft is brought into equilibrium.

Fig. 6 shows a detail of the blading to an enlarged scale. 21 and 22 are again the fixed and moving blades respectively, and 23 and 24 are projections on the shroudings 25 and 26 to form throttle gaps. Fig. 7 is an alternative construction in which the projections 23 and 24 are formed on the feet 27 and the shrouding 25 of the movable blades 22 to form the throttle gaps. Such construction for bridging the clearance between the blades is in itself known in impulse and reaction turbines.

I claim as my invention:

1. In a steam turbine, a shaft supported for rotation and for substantially free axial movement, a rotor fixed on said shaft and provided with blades, a stator provided with blades complementary to said first-named blades, means responsive to conditions of the steam pressure at said rotor over the normal operating range to balance the axial thrust on the rotating blades when said rotor is in a definite axial position whereat the clearance between the adjacent working faces of said blades is a definite amount, said balancing means being effective when said clearance becomes less than said amount to predominate over said thrust and effect axial movement of said rotor in a direction to increase said clearance, said balancing means being effective when said clearance becomes greater than said amount to permit said thrust to predominate and effect axial movement of said rotor in the opposite direction to decrease said clearance, means operable when said turbine is in the relatively cold and non-operating state to limit axial movement of said rotor in said opposite direction to a position whereat there is some clearance between the adjacent working faces of said blades, and means responsive only to conditions whereat the steam pressure is in a range below the normal operating range and operable at such conditions to effect axial movement of said rotor in the direction to increase said clearance.

2. In a steam turbine, stator and rotor members supported for substantially free axial movement with respect to each other, means constituting with said rotor member differential fluid-pressure means responsive to conditions of the steam pressure at said rotor member over the normal operating range to hold said members yieldingly in a definite predetermined position with respect to each other, and means responsive only to conditions whereat the steam pressure is in a range below the normal operating range and operable at such conditions to effect relative movement of said members out of said position.

3. In a steam turbine, stator and rotor members supported for substantially free axial movement with respect to each other, means constituting with said rotor member differential fluid-pressure means responsive to conditions of the steam pressure at said rotor member over the normal operating range to hold said members yieldingly in a definite predetermined position with respect to each other, means responsive only to conditions whereat the steam pressure is in a range below the normal operating range and operable at such conditions to effect relative movement of said members out of said position, and damping means for preventing relatively rapid relative movement of said members out of said position.

4. In a steam turbine, stator and rotor members supported for substantially free axial movement with respect to each other, means constituting with said rotor member differential fluid-pressure means responsive to conditions of the steam pressure at said rotor member over the normal operating range to hold said members yieldingly in a definite predetermined position with respect to each other, a thrust bearing for limiting relative axial movement of said members, and means forming part of said bearing and responsive only to conditions whereat the steam pressure is in a range below the normal operating range and operable at such conditions to effect relative movement of said members out of said position.

5. In a steam turbine, stator and rotor members supported for substantially free axial movement with respect to each other, means constituting with said rotor member differential fluid-pressure means responsive to conditions of the steam pressure at said rotor member over the normal operating range to hold said members yieldingly in a definite predetermined position with respect to each other, a thrust bearing for limiting relative axial movement of said members, a thrust element forming a bearing face of said bearing and movable axially in a direction to effect relative movement of said members out of said position, and means responsive only to conditions whereat the steam pressure is in a range below the normal operating range and operable at such conditions to impart such movement to said thrust element.

6. In a steam turbine, stator and rotor members supported for substantially free axial movement with respect to each other, means constituting with said rotor member differential fluid-pressure means responsive to conditions of the steam pressure at said rotor member over the normal operating range to hold said members yieldingly in a definite predetermined position with respect to each other, a thrust bearing for limiting relative axial movement of said members, a thrust element forming a bearing face of said bearing and movable axially in a direction to effect relative movement of said members out of said position, means responsive only to conditions whereat the steam pressure is in a range below the normal operating range and operable at such conditions to impart such movement to said thrust element, and means for retarding a reverse movement of said thrust element.

7. In a steam turbine, stator and rotor members supported for substantially free axial movement with respect to each other, means constituting with said rotor member differential fluid-pressure means responsive to conditions of the steam pressure at said rotor member over the normal operating range to hold said members yieldingly in a definite predetermined position with respect to each other, a thrust bearing for limiting relative axial movement of said members, a thrust element forming a bearing face of said bearing and movable axially outwardly to effect relative movement of said members out of said position, means responsive only to conditions whereat the steam pressure is in a range below the normal operating range and operable at such conditions to impart outward axial movement to said thrust element, means for retarding inward axial movement of said element, a second thrust element forming the opposite bearing face of said bearing and movable axially, means urging said second element axially outwardly, and means for retarding inward axial movement of said second element.

8. In a steam turbine, stator and rotor members supported for substantially free axial movement with respect to each other, means constituting with said rotor member differential fluid-pressure means responsive to conditions of the steam pressure at said rotor member over the normal operating range to hold said members yieldingly in a definite predetermined position with respect to each other, a thrust bearing for limiting relative axial movement of said members, a thrust element forming a bearing face of said bearing and movable axially outwardly to effect relative movement of said members out of said position, spring means effective only during conditions whereat the steam pressure is in a range below the normal operating range to impart outward axial movement to said thrust element, a second thrust element forming the opposite bearing face of said bearing and movable axially, means urging said second element axially outwardly, and means for retarding inward axial movement of said elements.

In testimony whereof I have hereunto subscribed my name this 7th day of May A. D. 1931.

ADOLF MEYER.